US012691565B2

(12) United States Patent (10) Patent No.: US 12,691,565 B2
Davis et al. (45) Date of Patent: Jul. 28, 2026

(54) USER INTERFACE FOR HAND-HELD POWER TOOLS

(71) Applicant: Ingersoll-Rand Industrial U.S., Inc., Davidson, NC (US)

(72) Inventors: Roger B. Davis, Clinton, NJ (US); James F. Bouchard, Easton, PA (US); Pinhua Xie, Davidson, NC (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 18/909,433

(22) Filed: Oct. 8, 2024

(65) Prior Publication Data

US 2025/0128395 A1 Apr. 24, 2025

Related U.S. Application Data

(60) Provisional application No. 63/589,150, filed on Oct. 10, 2023.

(51) Int. Cl.
*B25F 5/02* (2006.01)
*B25B 21/02* (2006.01)
*B25B 23/147* (2006.01)
*G06F 3/0487* (2013.01)

(52) U.S. Cl.
CPC .............. *B25F 5/02* (2013.01); *G06F 3/0487* (2013.01); *B25B 21/02* (2013.01); *B25B 23/1475* (2013.01)

(58) Field of Classification Search
CPC .......... B25F 5/02; G06F 3/0487; B25B 21/02; B25B 23/1475
See application file for complete search history.

(56) References Cited

U.S. PATENT DOCUMENTS

| | | | | |
|---|---|---|---|---|
| 5,014,793 | A | * | 5/1991 | Germanton ............... H02P 1/18 |
| | | | | 81/473 |
| 5,563,482 | A | * | 10/1996 | Shaw ..................... B23P 19/066 |
| | | | | 318/272 |
| 10,237,742 | B2 | * | 3/2019 | Zeiler ................... G01S 5/0027 |
| 10,339,496 | B2 | * | 7/2019 | Matson ............... G06Q 10/087 |
| 10,562,116 | B2 | * | 2/2020 | Dey, IV .................... B25F 5/00 |
| 10,646,982 | B2 | * | 5/2020 | Dey, IV .................... B25F 5/00 |
| 11,571,803 | B2 | * | 2/2023 | Davis ............... H04M 1/72412 |

(Continued)

FOREIGN PATENT DOCUMENTS

| | | | | |
|---|---|---|---|---|
| WO | WO-0105559 | A2 | * 1/2001 | ............... B25F 5/02 |
| WO | WO-2023278587 | A1 | * 1/2023 | ........... B25B 21/005 |

*Primary Examiner* — Lucas E. A. Palmer
(74) *Attorney, Agent, or Firm* — Kevin E. West; Advent, LLP

(57) ABSTRACT

A user interface for a hand-held portable power tool is shown and described. In embodiments, the hand-held portable power tool includes a motor, a controller operatively coupled to the motor, and a user interface in electrical communication with the controller. The user interface includes a display screen and a plurality of control buttons, the controller is configured to receive inputs from the control buttons when at least one button among the plurality of control buttons is actuated and display an image on the display screen, wherein the image includes at least a plurality of icons that correspond to the plurality of control buttons, such that interacting with a respective control button adjacent to a respective icon displayed on the user interface causes the user interface to display information pursuant to the respective icon.

20 Claims, 16 Drawing Sheets

(56)     References Cited

U.S. PATENT DOCUMENTS

| 12,322,280 | B2* | 6/2025 | Matson | ................. | H04L 67/306 |
| 2011/0030653 | A1* | 2/2011 | Cohn | ................. | F02D 41/0025 |
| | | | | | 123/304 |
| 2013/0193891 | A1* | 8/2013 | Wood | ....................... | H02P 6/08 |
| | | | | | 318/434 |
| 2014/0159919 | A1* | 6/2014 | Furui | ....................... | B25F 5/00 |
| | | | | | 340/870.07 |
| 2016/0325391 | A1* | 11/2016 | Stampfl | .................... | B25F 5/00 |
| 2016/0342151 | A1* | 11/2016 | Dey, IV | ............. | G06F 3/04847 |
| 2017/0348835 | A1* | 12/2017 | Skelly | ................. | B25B 23/0078 |
| 2018/0318999 | A1* | 11/2018 | Lovelass | .............. | B25B 23/147 |
| 2019/0217460 | A1* | 7/2019 | Mahalingappa | .......... | B25F 5/02 |
| 2019/0373806 | A1* | 12/2019 | Wataya | .............. | G06F 3/04855 |
| 2020/0094392 | A1* | 3/2020 | Larsen | ..................... | B25F 5/02 |
| 2021/0078146 | A1* | 3/2021 | Araki | ...................... | B25F 5/001 |
| 2021/0205976 | A1* | 7/2021 | Matei | ....................... | G08B 7/06 |
| 2021/0223760 | A1* | 7/2021 | Dey, IV | ............ | G05B 19/4155 |
| 2022/0296982 | A1* | 9/2022 | Kalfa | .................... | A47B 11/00 |

* cited by examiner

100

100

100

210

100

100

100

100

128

100

130

100

100

100

100

100

100

100

100

100

100

USER INTERFACE FOR HAND-HELD POWER TOOLS

BACKGROUND

Portable (hand-held) power tools include a variety of tools actuated by a power source, such as an electric or pneumatic motor, that are configured to be held by an operator during use. Depending on the application in which the tools are used, portable power tools vary greatly in size, torque, and speed of operation. Portable power tools can include controls that permit a user to interact with features of the tool, such as to select various tool settings.

DRAWINGS

The Detailed Description is described with reference to the accompanying figures. In the figures, the use of the same reference numbers in different instances in the description and the figures may indicate similar or identical items.

DETAILED DESCRIPTION

Overview

Figure 1A:
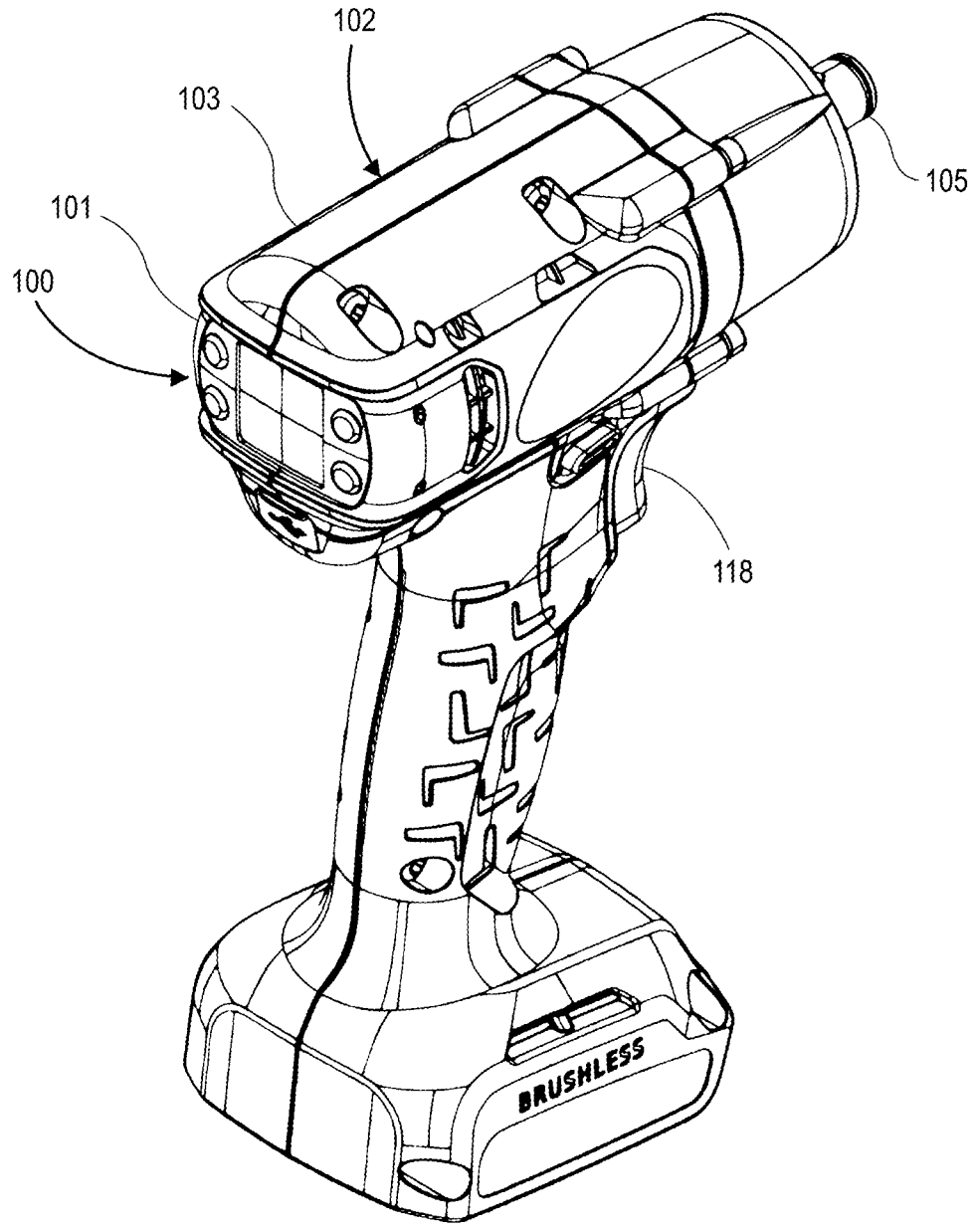
FIG. 1A is a rear perspective view of a hand-held power tool including a user interface having as display screen and four control buttons, in accordance with example embodiments of the present disclosure.
Figure 1B:
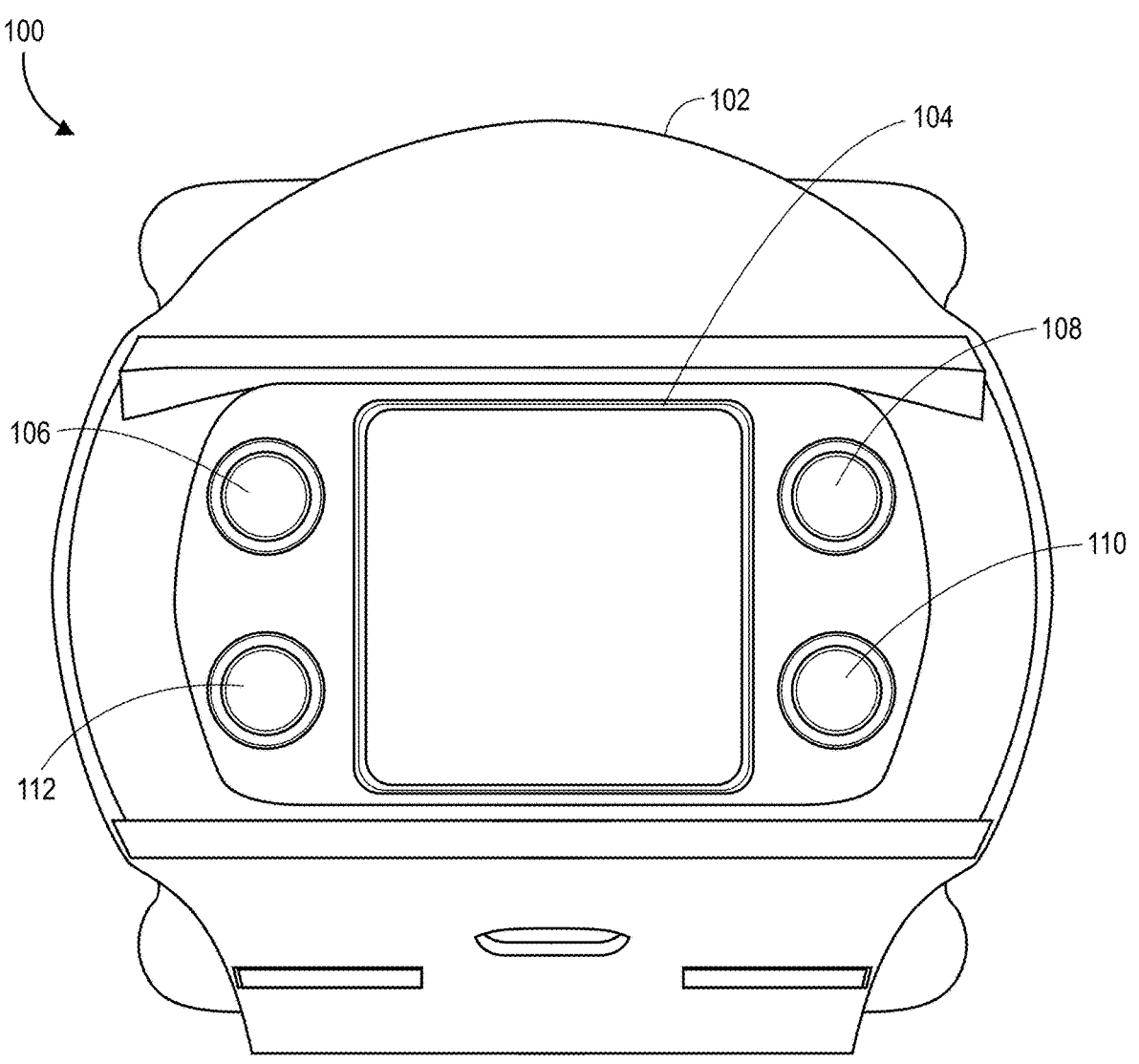
FIG. 1B is a partial rear view of the hand-held power tool of FIG. 1A.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

Hand-held portable power tools can be utilized in a variety of environments, such as assembly environments where an individual tool can facilitate the introduction of fasteners to pieces of assembled machinery, oftentimes repeated for subsequent pieces of similar fabrication pieces throughout a work schedule for an individual operator or multiple operators. For example, hand-held tools can include impact drivers, reactionless drivers, or power drills.

Various portable power tools can include various controls and basic seven-segment displays, however, such seven-segment displays limit the availability, readability, and usability of the information provided. Furthermore, such seven-segment displays can be located in an inconvenient location for an operator, such as a location requiring the operator to manipulate the tool to an orientation (e.g., with a display on the handle) that differs from a working orientation.

Accordingly, the present disclosure is directed, at least in part, to systems and methods for providing a user interface for a hand-held portable power tool that provides a user interface suitable for maintaining the tool in a working orientation. In aspects, the tool can include a reactionless fastening tool (e.g., utilizing a rotatable hammer with an anvil) having one or more sensors configured to output information associated with operation of the tool, where such tool can be suitable for use in an assembly environment.

Example Embodiments

Referring to FIGS. 1A through 23, a user interface 100 for a hand-held portable power tool 102 is shown in accordance with example embodiments of the present disclosure. The hand-held portable power tool 102 can include, but is not limited to, a reactionless fastening tool, such as an impact driver, impact wrench, or the like. In such embodiments, the hand-held portable power tool can employ a motor that drives a rotatable mass (e.g., hammer) which stores kinetic energy through its rotation and abruptly delivers the energy to an anvil connected to an output shaft, subjecting the anvil to repeated and sudden shock loading. As the rotating mass drives the anvil and the output shaft, it may be necessary to determine the angular velocity or position of the rotating anvil. Rotary power tools may include optical or magnetic sensors that track the angle of rotating elements. One such example is through toothed gear encoder sensors that sense rotating teeth cut into the periphery of the rotating element.

The user interface 100 is shown positioned on a rear portion 101 of the tool body 103, where the rear portion 101 can be positioned opposite the output drive 105 of the tool 102 such that the operator of the tool can view the user interface 100 without substantial manipulation of the tool 102 away from a working orientation of the tool 102. The user interface 100 is shown generally including a display screen 104 and a plurality of control buttons (control buttons 106, 108, 110, and 112 are shown). While the tool 102 is shown having four control buttons and a single display screen 104, the user interface 100 is not limited to such configurations and can include configurations having fewer than four control buttons, more than four control buttons, and/or more than one display screen without departing from the scope of the present disclosure. In embodiments, the display screen 104 is a liquid crystal display (LCD) screen having a resolution of approximately 240 pixels×240 pixels, however the user interface 100 is not limited to such configuration and can include differing screen types (e.g., liquid crystal display (LCD), light emitting diode, (LED), organic light emitting diode (OLED), etc.), differing resolutions, and so forth.

Figure 2:
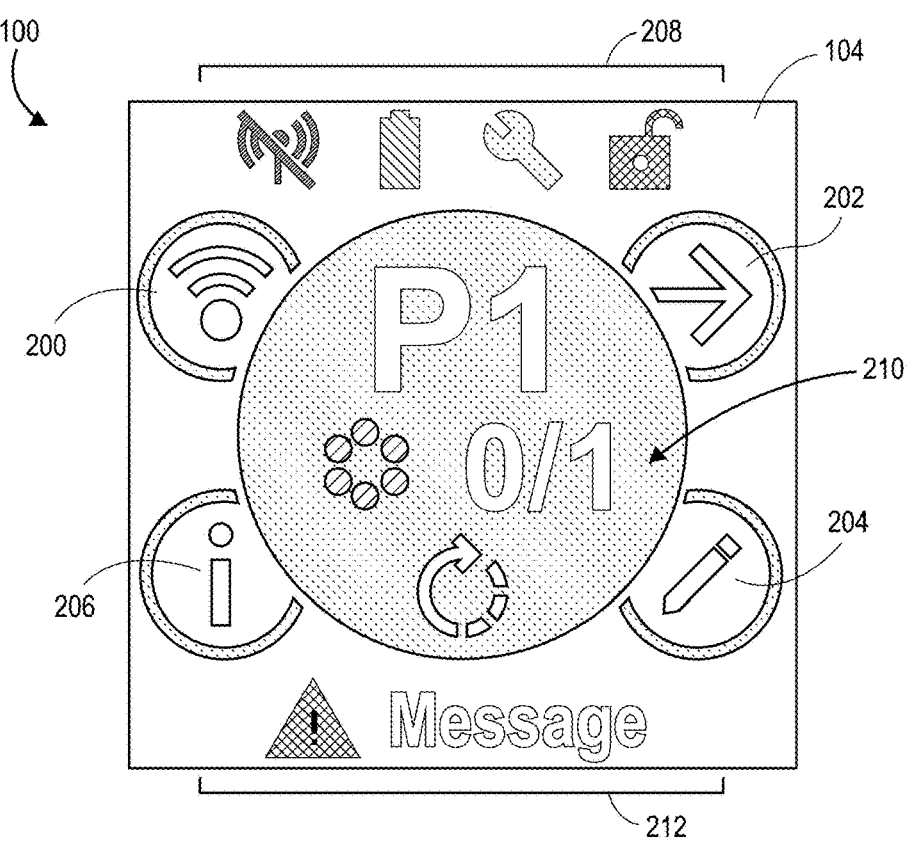
FIG. 2 is an output image of the display screen of the user interface of FIG. 1, shown with four icons corresponding to the four control buttons, in accordance with example embodiments of the present disclosure.

Referring to FIG. 2, an output image of the display screen 104 of the user interface 100 is shown. In embodiments, the display screen 104 displays one or more icons that are symbolic representations of an operation or setting of the power tool 102 that are interactable via corresponding one or more buttons. For example, the image is shown with four icons (icons 200, 202, 204, and 206 are shown) that correspond to the positions of the four control buttons 106, 108, 110, and 112, respectively. In embodiments, each control button is located adjacent to the display screen 104 with each button being located proximate to its corresponding icon. In embodiments, each control and its respective icon on the display screen 104 share a corresponding same shape. For example, each button (on the housing 103) and corresponding icon (on display screen 104) can be but are not limited to various geometric shapes, such as circular, oval, square, rectangular, triangular, and hexagonal shapes. In a further embodiment, each button and its respective icon may have shapes that differ from one or more other button and respective icon. For example, buttons 106 and 108 and respective icons 200 may be square shaped while buttons 110 and 112 may be circularly shaped.

In embodiments, the one or more buttons (e.g., buttons 106, 108, 110, and 112) are respectively superimposed (i.e., virtual buttons) on the one or more icons (e.g., icons 200, 202, 204, and 206) on the display screen 104. In this embodiment, display screen 104 is a touch screen that displays the one or more icons, and one or more regions of the display screen 104 corresponding to the one one or more icons are touch sensitive and execute as corresponding one or more buttons. For example, an icon 200 associated with an operation of the power tool 102 (e.g., wireless settings of the power tool 102) displayed on the display screen 104 occupies a region of the display screen 104 that is touch sensitive (i.e., button 106). When controller 116 determines that a user has touched the region (i.e., button 106), controller 116 executes instructions associated with the icon 200 (e.g., wireless settings are displayed on the display screen 104).

In embodiments, when the user interacts with control button 106 when the user interface 100 is as shown in FIG. 2, the user interface 100 permits the user to engage with wireless communication settings for the tool 102; when the user interacts with control button 108, the user interface 100 permits the user to cycle to additional control settings of the tool 102 (e.g., as facilitated through remote setup by a remote controller system in communication with the tool 102); when the user interacts with control button 110, the user interface 100 permits the user to edit settings of the operation of the tool 102; and when the user interacts with control button 112, the user interface 100 permits the user to view information about the tool 102 or operational control thereof. The user interface 100 is also shown having a general informational area 208 to show information associated with wireless connectivity, battery life, maintenance notifications, system lock or unlock states, or the like, however, the user interface 100 is not limited to such information and include more information or less information than is provided without departing from the scope of the present disclosure.

The user interface 100 is further shown with a settings information area 210, which can show, for example, a current control setting of the tool 102, a batch count of the tool 102, a rotational direction for the tool 102, or the like, however, the user interface 100 is not limited to such information and include more information or less information than is provided without departing from the scope of the present disclosure. The control setting of the tool 102 can include a stored Pset (i.e., an operational setting) for the tool 102, which can direct tool operations by controlling settings including, but is not limited to, rotation direction, speed, reverse speed, acceleration, torque, torque limit, cycle timeout, trace data information, step type (e.g., target angle, target torque, etc.), or the like, or combinations thereof. The user interface 100 is further shown with a message area 212, which can broadcast different messages to the user.

In embodiments, the user interface 100 displays a color corresponding to fastening operation state, which includes, but is not limited to, a successful fastening operation, a marginal fastening operation, and a failed fastening operation. Determination of whether a successful fastening operation has occurred can be performed through onboard or remote analysis of sensor data associated with one or more sensors 114 of the tool 102, wherein the one or more sensors 114 can include, for example, transducers, encoders, torque sensors, voltage sensors, current sensors, tachometers, etc. that measure torque, rotation speed, power output, cycle count of the motor and/or an output drive that is coupled to the motor generally associated with a state of a fastening operation performed by the power tool 102.

In embodiments, controller 116 determines and displays a successful fastening operation when the controller 116 detects from one or more sensors that the output drive 105 or motor 120 has accomplished a predetermined value, wherein the predetermined value includes at least one of, but is not limited to, a predetermined value of revolutions, cycle count, torque, speed, or power output.

In embodiments, controller 116 determines and displays a marginal fastening operation when the controller 116 detects from the one or more sensors that the output drive 105 or motor 120 has not accomplished a predetermined value while the fastening operation is occurring (e.g., the controller 116 determines from the one or more sensors that at least one of, but is not limited to, the motor 120 is being supplied with electrical power, the motor 120 and/or output drive 105 is currently rotating, torque supplied to the output drive 105 is increasing with time.

In embodiments, controller 116 determines and displays a failed fastening operation when the controller 116 detects from the one or more sensors that the output drive 105 or motor 120 has not accomplished a predetermined value, the fastening operation has previously occurred and is no longer occurring (e.g., the controller 116 determines from the one or more sensors that at least one of, but is not limited to, the motor 120 is not being supplied with electrical power, the motor 120 and/or output drive 105 is not currently rotating, torque is not supplied to the output drive 105).

Figure 3:
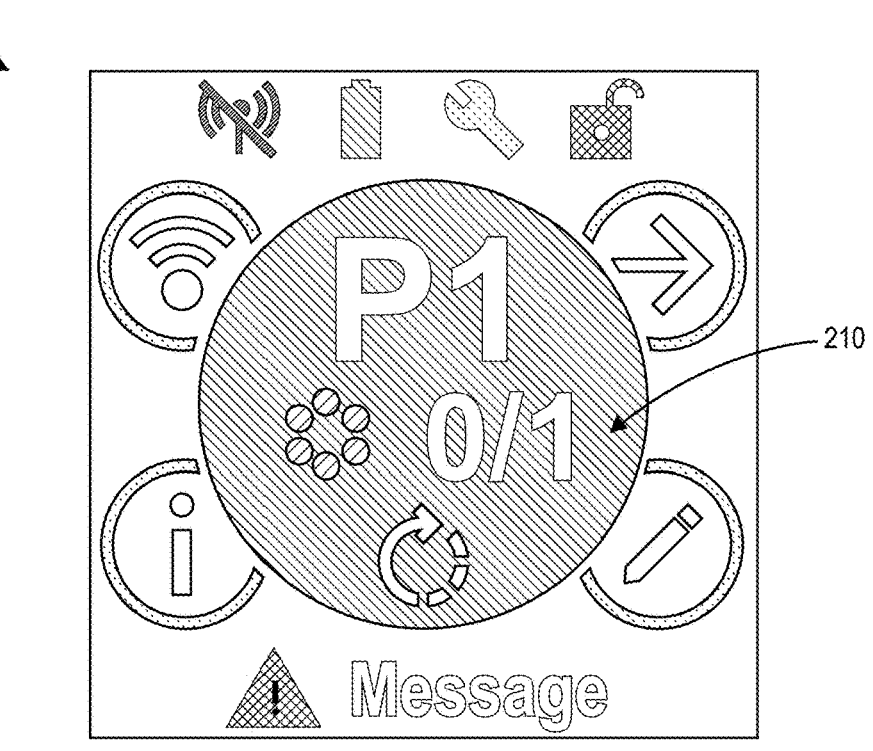
FIG. 3 is an output image of a screen of the display of the user interface of FIG. 2, shown in a first display configuration, in accordance with example embodiments of the present disclosure.
Figure 4:
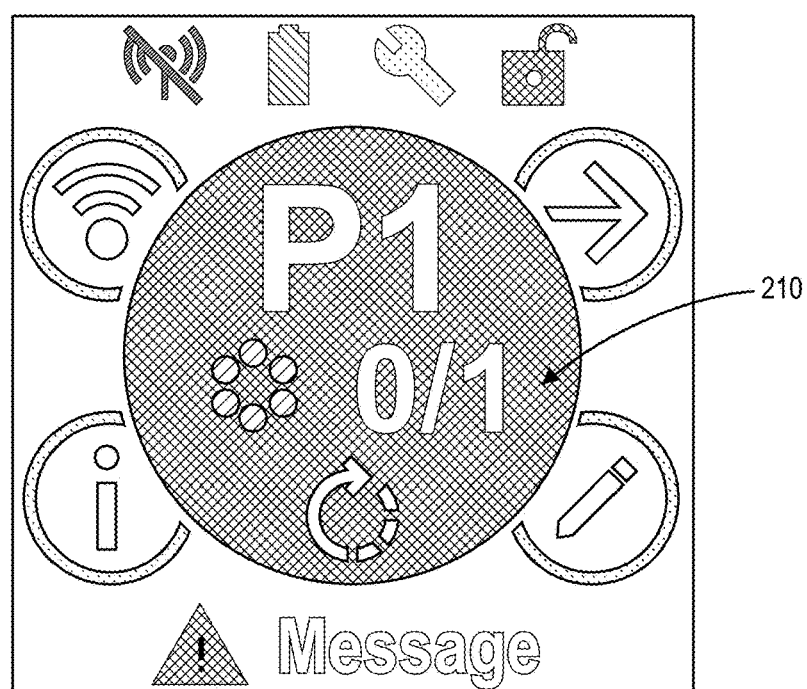
FIG. 4 is an output image of a screen of the display of the user interface of FIG. 2, shown in a second display configuration, in accordance with example embodiments of the present disclosure.
Figure 5:
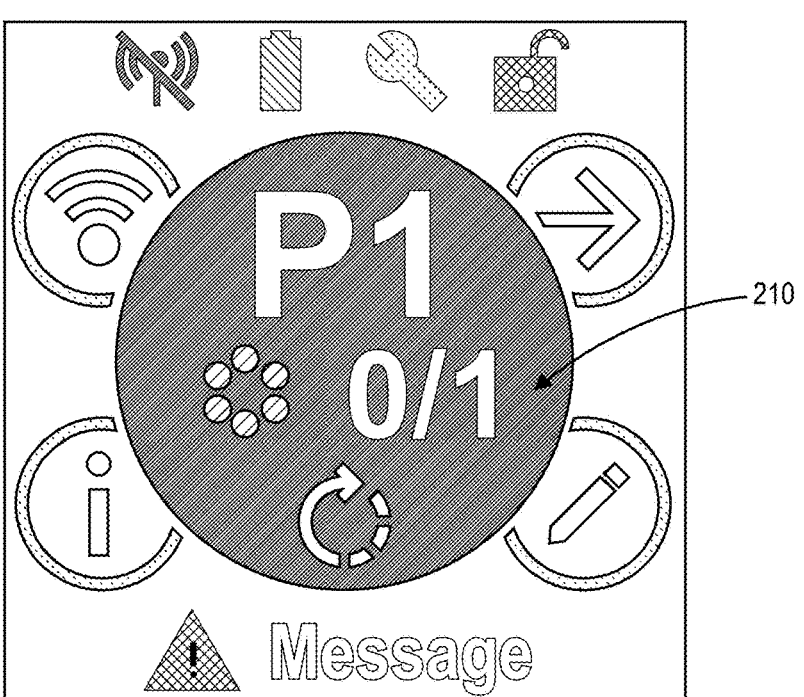
FIG. 5 is an output image of a screen of the display of the user interface of FIG. 2, shown in a third display configuration, in accordance with example embodiments of the present disclosure.

Referring to FIG. 3, the user interface 100 is shown having the settings information area 210 with a green background, which indicates to the user that a successful fastening operation has occurred. Referring to FIG. 4, the user interface 100 is shown having the settings information area 210 with a yellow background, which indicates to the user that a marginal fastening operation has occurred (e.g., a fastening operation in between a successful fastening operation and a failed fastening operation). Referring to FIG. 5, the user interface 100 is shown having the settings information area 210 with a red background, which indicates to the user that a failed fastening operation has occurred.

Figure 6:
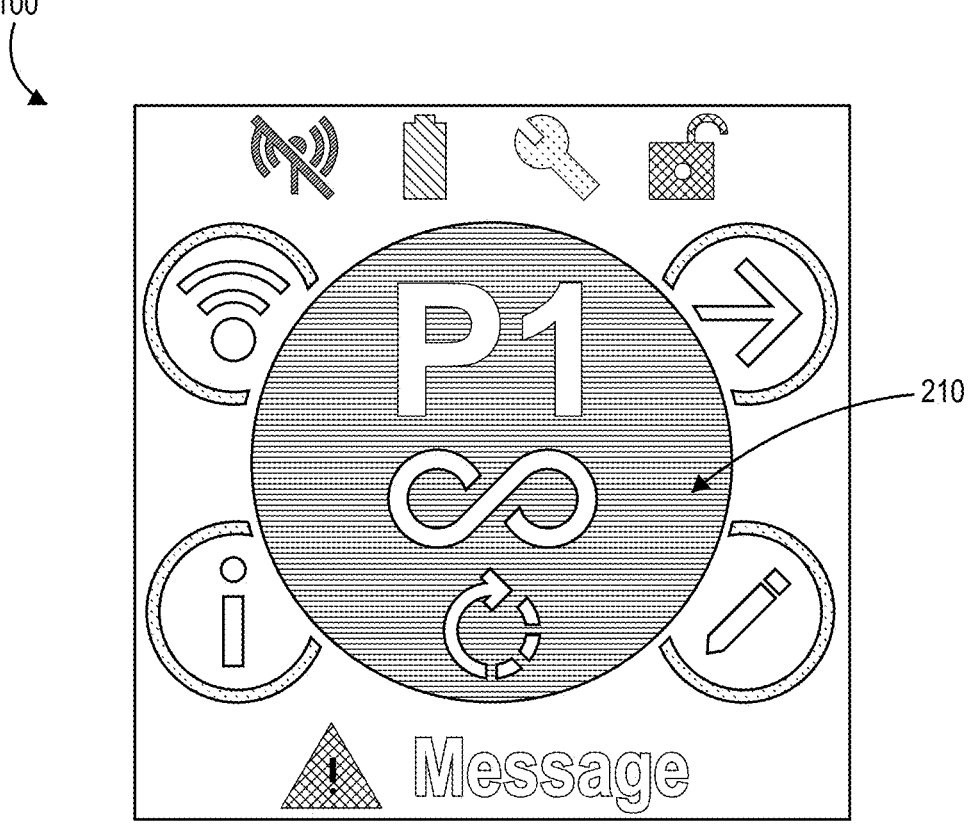
FIG. 6 is an output image of a screen of the display of the user interface of FIG. 2, shown in a fourth display configuration, in accordance with example embodiments of the present disclosure.

In embodiments, the user interface 100 displays a color corresponding to a power mode of the power tool 102, which include, but is not limited to, a full power mode. In embodiments, the power mode is an operational setting stored in memory 132. Referring to FIG. 6, the user interface 100 is shown having the settings information area 210 with a blue background, which indicates to the user that the tool is currently in a full power mode (i.e., the power tool 102 is in an operational mode facilitated by controller 116 that outputs maximum torque and/or maximum drive speed capable by the power tool 102 without limiting the torque and/or drive speed by the controller 116).

Figure 7:
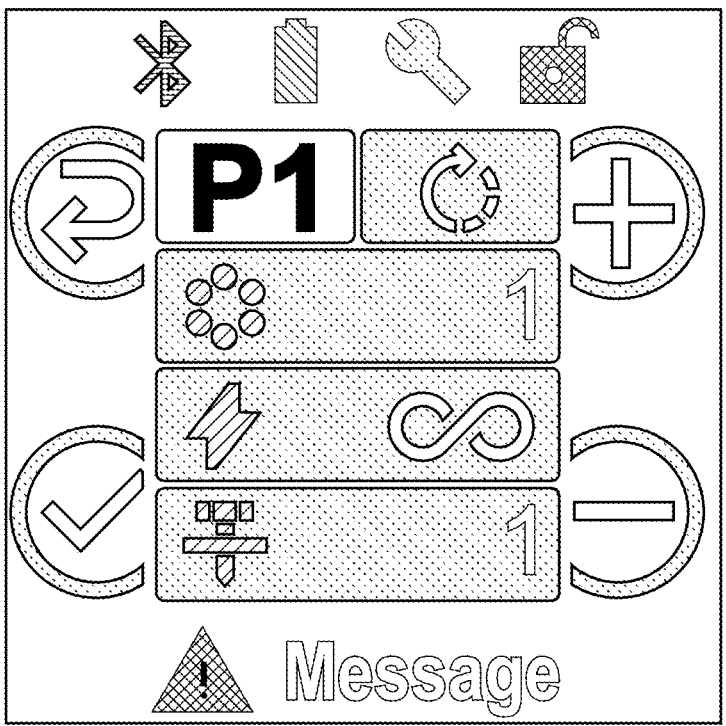
FIG. 7 is an output image of the display screen of the user interface of FIG. 1, shown in an edit settings configuration, in accordance with example embodiments of the present disclosure.
Figure 8:
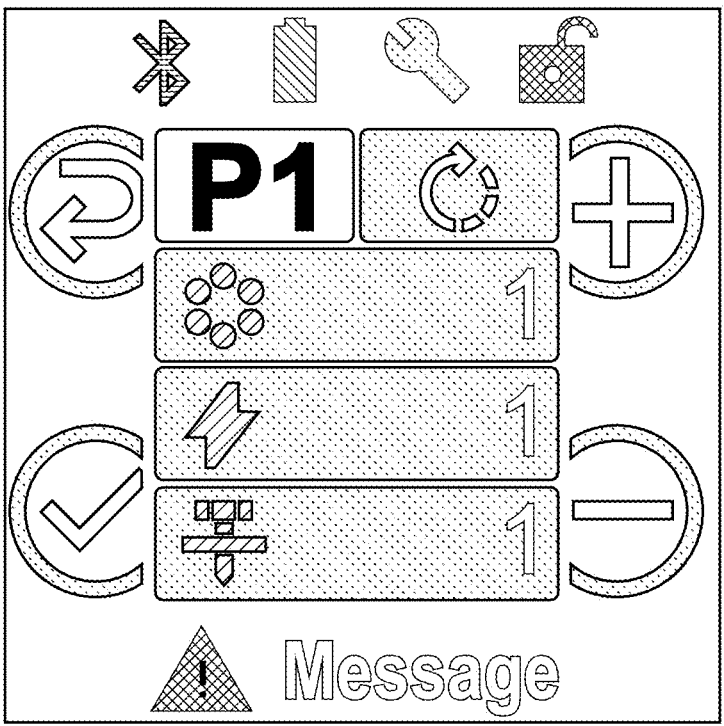
FIG. 8 is an output image of the display screen of the user interface of FIG. 7, shown in another edit settings configuration, in accordance with example embodiments of the present disclosure.

Referring to FIGS. 7 and 8, the user interface 100 is shown pursuant to when the user interacts with control button 110 to engage an edit settings configuration (e.g., to alter Pset settings). As shown, the icons 200, 202, 204, and 206 are shown having different images than those shown in FIG. 2, indicating that the user interface 100 is configured to implement different actions when the user interacts with the control buttons 106, 108, 110, and 112, such as, for example, tabbing between different data fields, increasing or decreasing data values, accepting changes to the settings, or the like. For instance, FIG. 8 shows a change from full power mode in FIG. 7 to a power level of 1 in FIG. 8.

Figure 9:
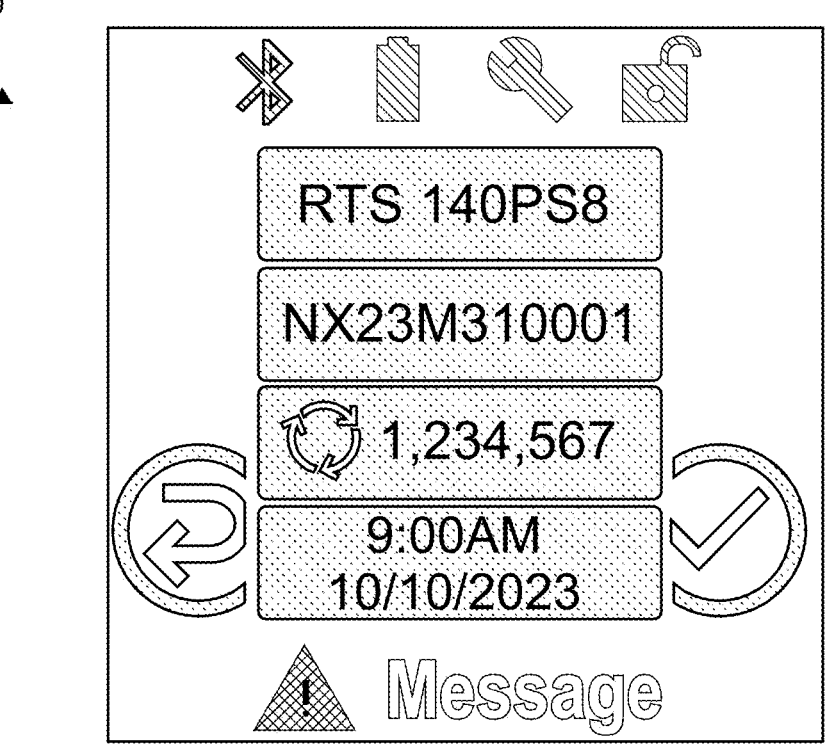
FIG. 9 is an output image of the display screen of the user interface of FIG. 1, shown in an information view configuration, in accordance with example embodiments of the present disclosure.

Referring to FIG. 9, the user interface 100 is shown pursuant to when the user interacts with control button 112 to engage an information view configuration to show various information about the tool. The information is shown including a model number of the tool 102, serial number of the tool 102, a cycle count for the tool 102, and system date and time information, but can feature different information without departing from the scope of the present disclosure.

Figure 10:
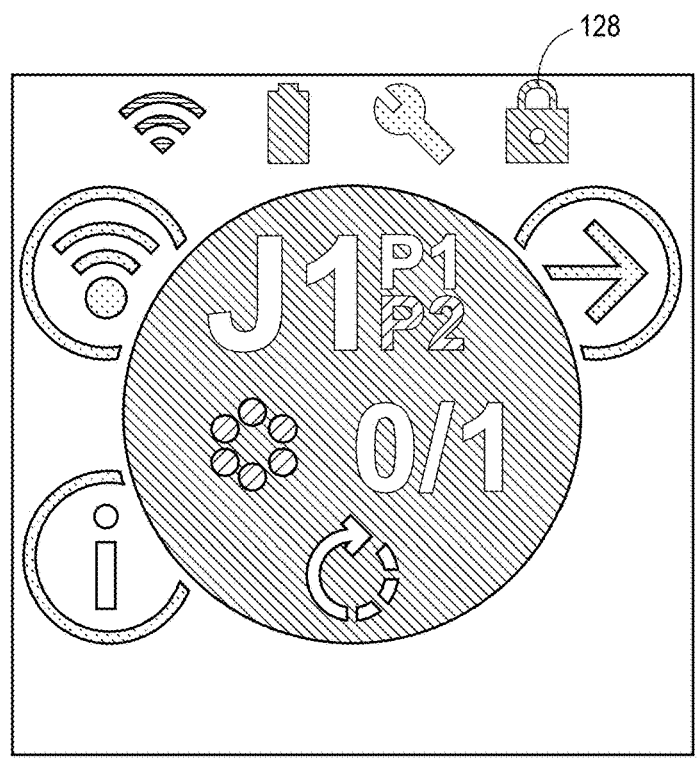
FIG. 10 is an output image of the display screen of the user interface of FIG. 1, shown in a configuration where a remote controller system controls operational aspects of the tool, in accordance with example embodiments of the present disclosure.
Figure 11:
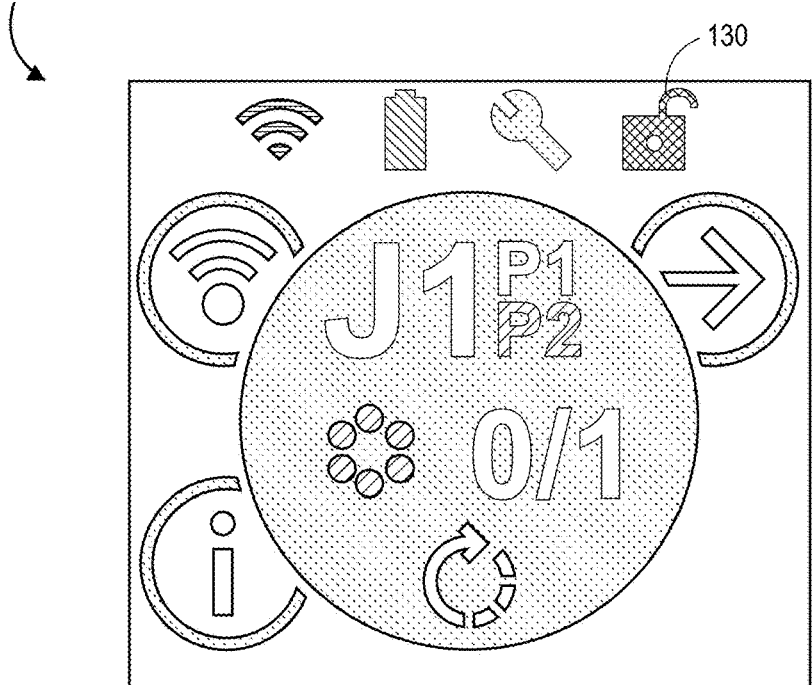
FIG. 11 is an output image of the display screen of the user interface of FIG. 10, shown in an unlocked configuration, in accordance with example embodiments of the present disclosure.
Figure 12:
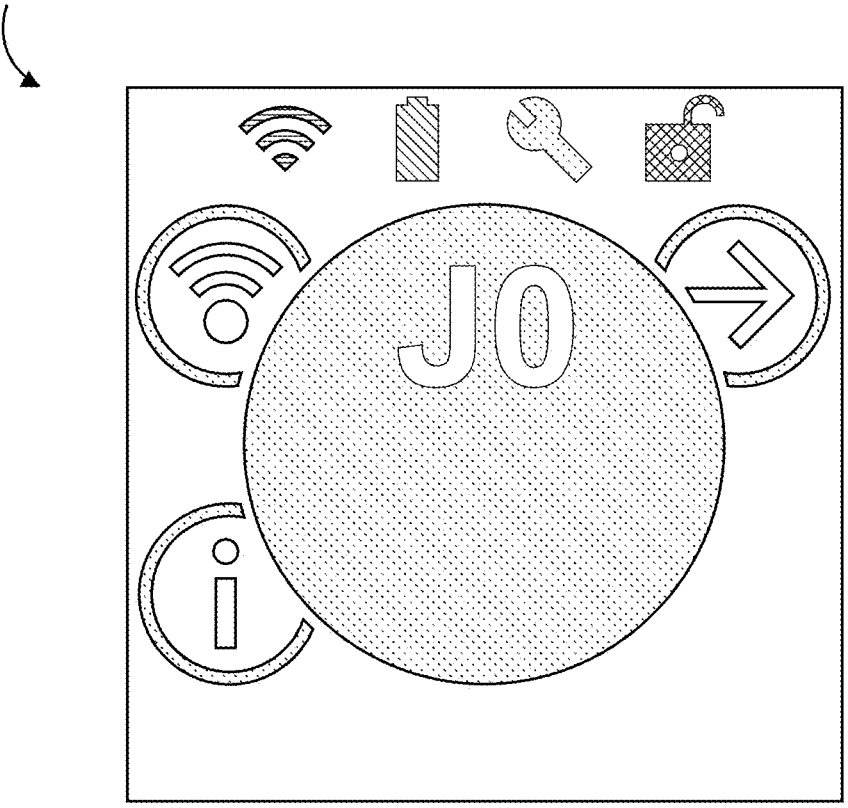
FIG. 12 is an output image of the display screen of the user interface of FIG. 10, shown in a configuration where no job is selected by the controller system, in accordance with example embodiments of the present disclosure.
Figure 13:
FIG. 13 is an output image of the display screen of the user interface of FIG. 1, shown in a wireless communication settings configuration, in accordance with example embodiments of the present disclosure.
Figure 13:
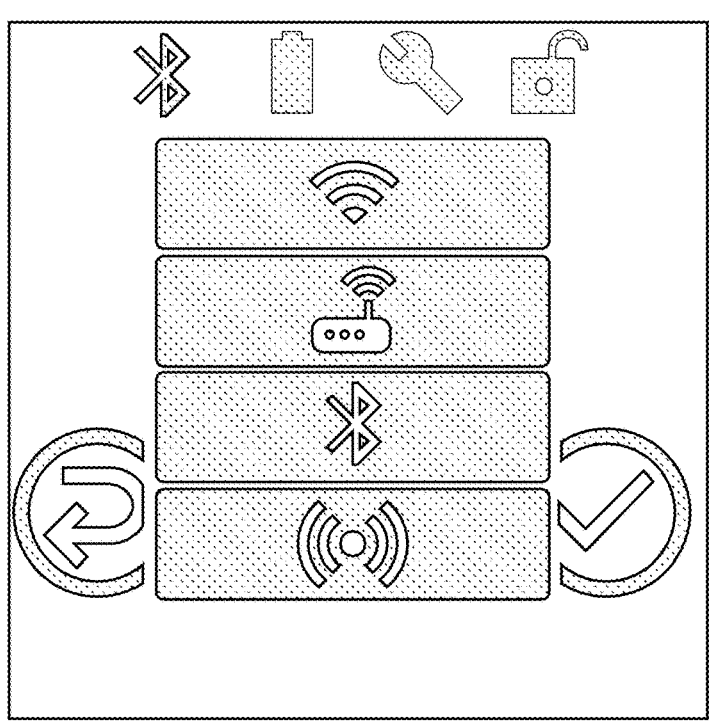

Referring to FIGS. 10 through 12, the user interface 100 is shown with the settings information area 210 providing information about settings of the tool 102 dictated by aspects set through a controller system (e.g., controller 116 or remote server computer 112 with associated accessible memory). The information can include a job number setting, where a job can include one or more Psets to be used for a given job, dictate which sockets can be used, rules for when a different Pset is selected by the tool, rules for failure conditions, or the like, or combinations thereof. For example, the user interface 100 is shown in FIG. 10 where the tool 102 is in a locked configuration, indicated by lock icon 128 which locks certain operations of the user interface (e.g., preventing cycling between Psets or changing jobs, but permits information to be displayed; disabling the one or more buttons). The user interface 100 is shown in FIG. 11 where the tool 102 is in an unlocked configuration, indicated by unlock icon 130, which permits the user to cycle between differing Pset values (e.g., from P1 to P2), and is shown in FIG. 12 where no particular job is assigned to the tool 102 by the controller system. In some embodiments, the locked configuration disables motor 120 of the power tool 102 until the power tool 102 enters an unlocked configuration.

Figure 14:
FIG. 14 is an output image of the display screen of the user interface of FIG. 13, shown in a wireless network selection configuration, in accordance with example embodiments of the present disclosure.
Figure 14:
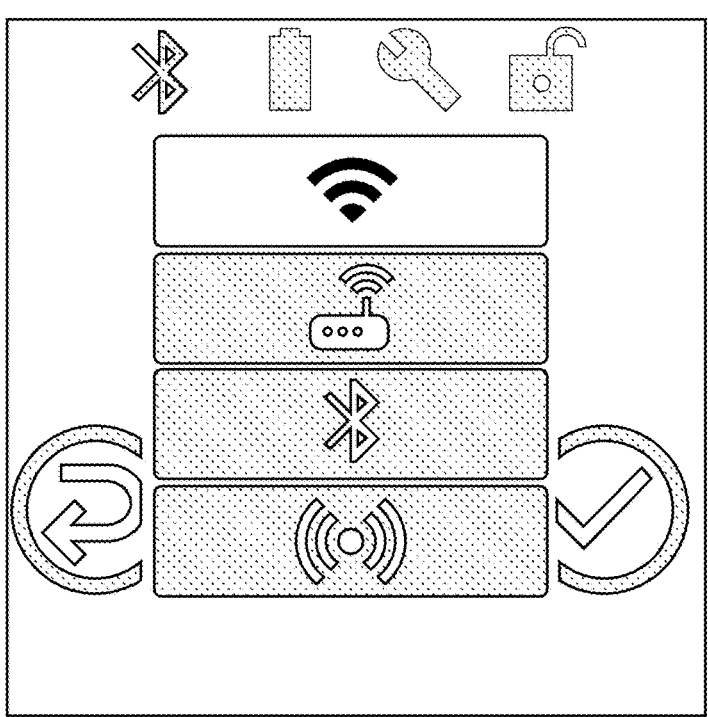
Figure 15:
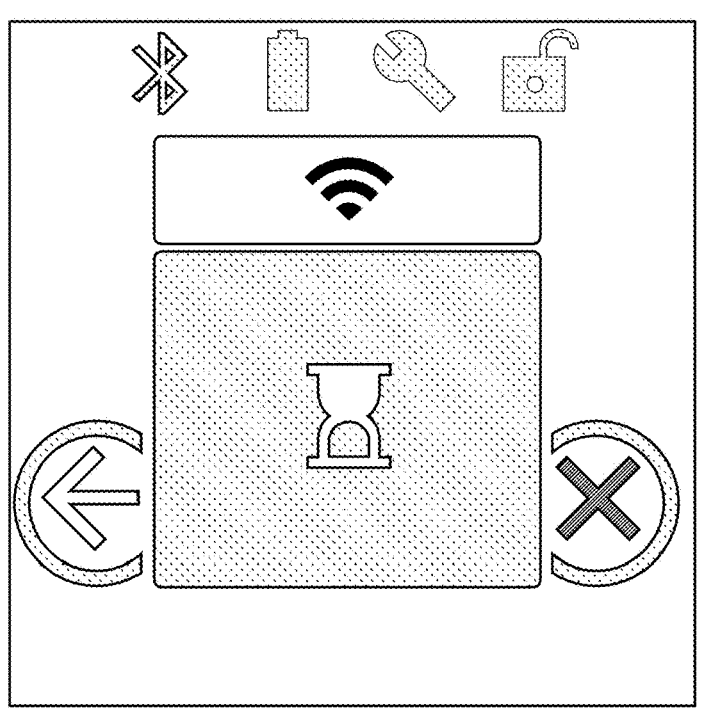
FIG. 15 is an output image of the display screen of the user interface of FIG. 14, shown in a wireless network pairing configuration, in accordance with example embodiments of the present disclosure.
Figure 16:
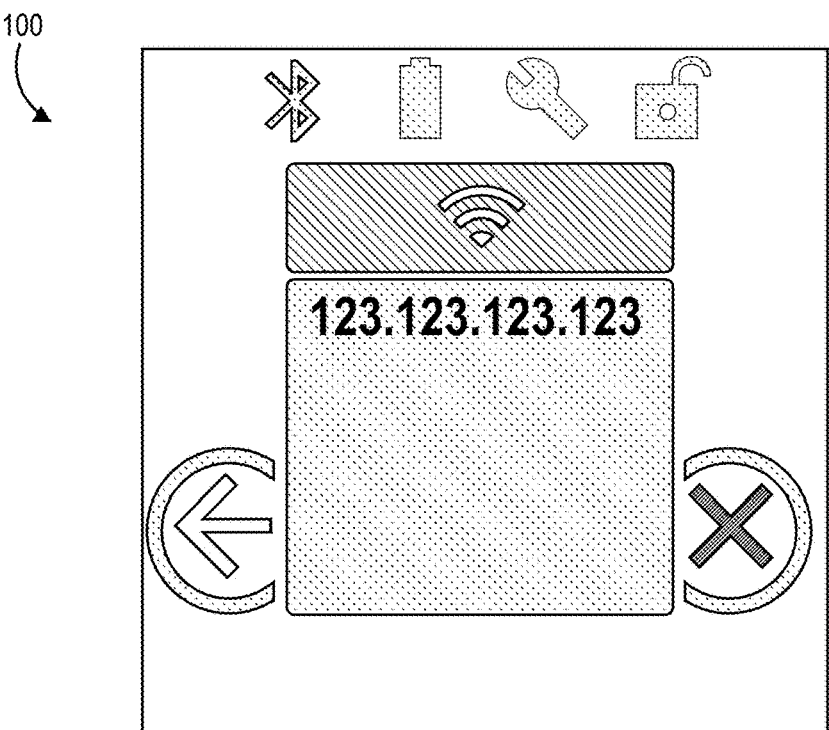
FIG. 16 is an output image of the display screen of the user interface of FIG. 15, shown in a wireless network paired configuration, in accordance with example embodiments of the present disclosure.
Figure 17:
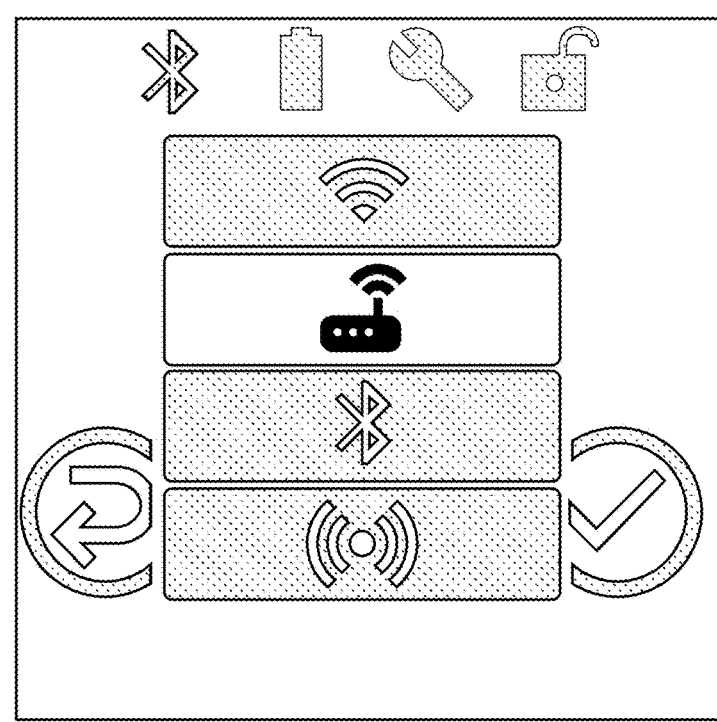
FIG. 17 is an output image of the display screen of the user interface of FIG. 13, shown in a wireless network access point selection configuration, in accordance with example embodiments of the present disclosure.
Figure 18:
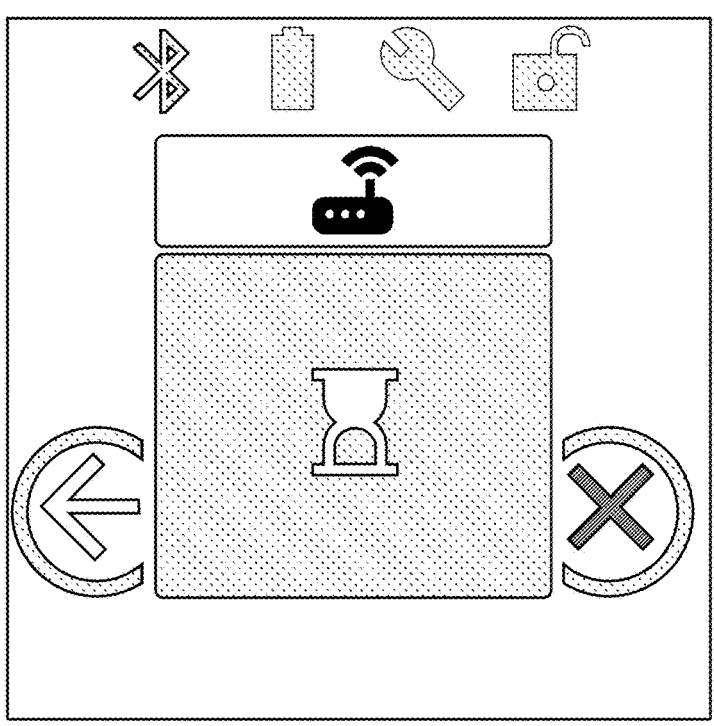
FIG. 18 is an output image of the display screen of the user interface of FIG. 17, shown in a wireless network access point pairing configuration, in accordance with example embodiments of the present disclosure.
Figure 19:
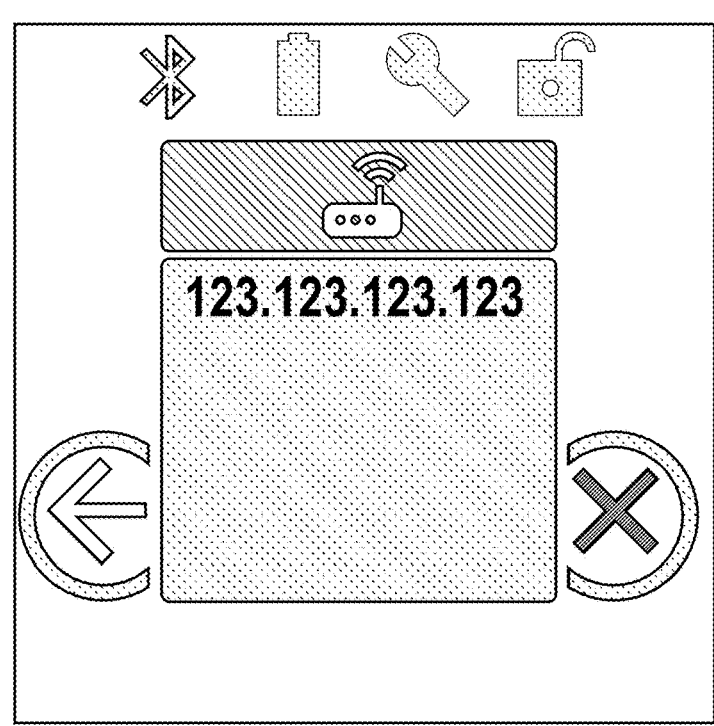
FIG. 19 is an output image of the display screen of the user interface of FIG. 18, shown in a wireless network access point paired configuration, in accordance with example embodiments of the present disclosure.
Figure 20:
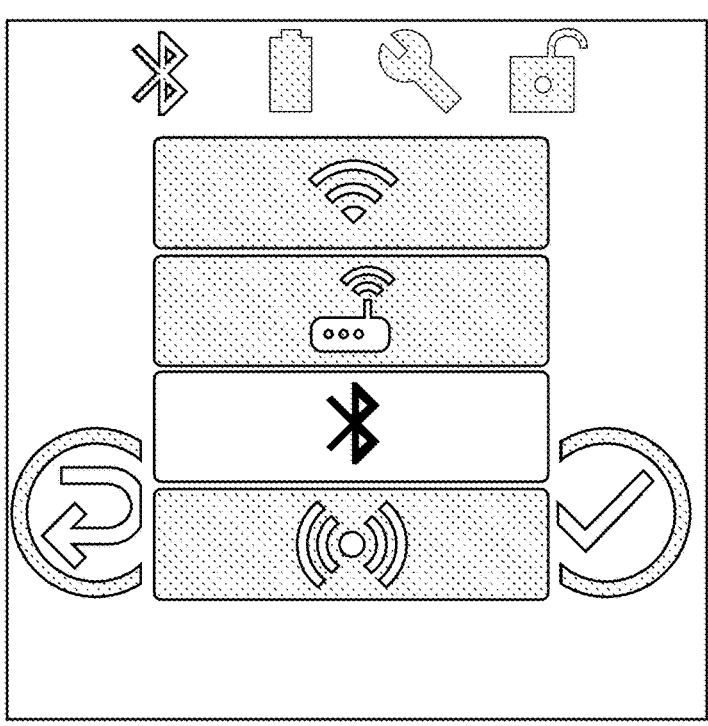
FIG. 20 is an output image of the display screen of the user interface of FIG. 13, shown in a personal area network selection configuration, in accordance with example embodiments of the present disclosure.
Figure 21:
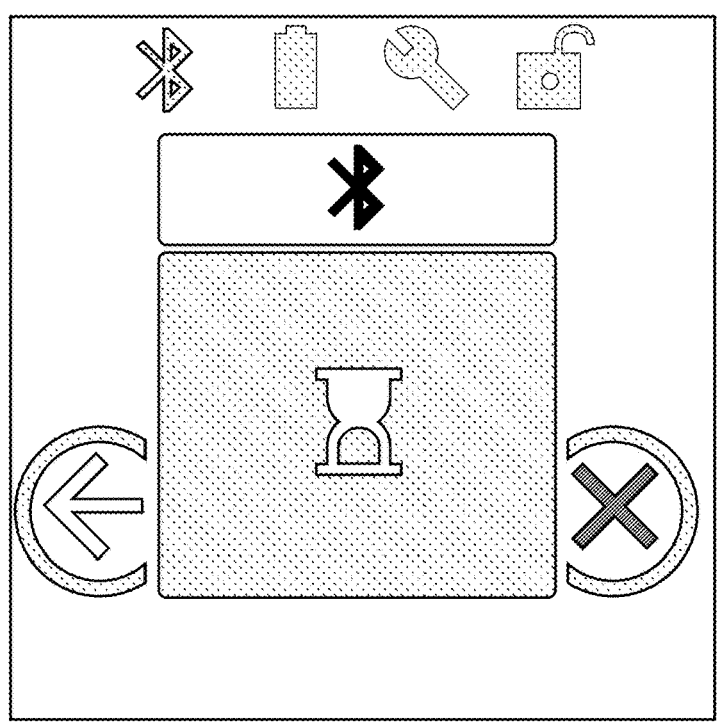
FIG. 21 is an output image of the display screen of the user interface of FIG. 20, shown in a personal area network pairing configuration, in accordance with example embodiments of the present disclosure.
Figure 22:
FIG. 22 is an output image of the display screen of the user interface of FIG. 21, shown in a password/handshake configuration, in accordance with example embodiments of the present disclosure.
Figure 23:
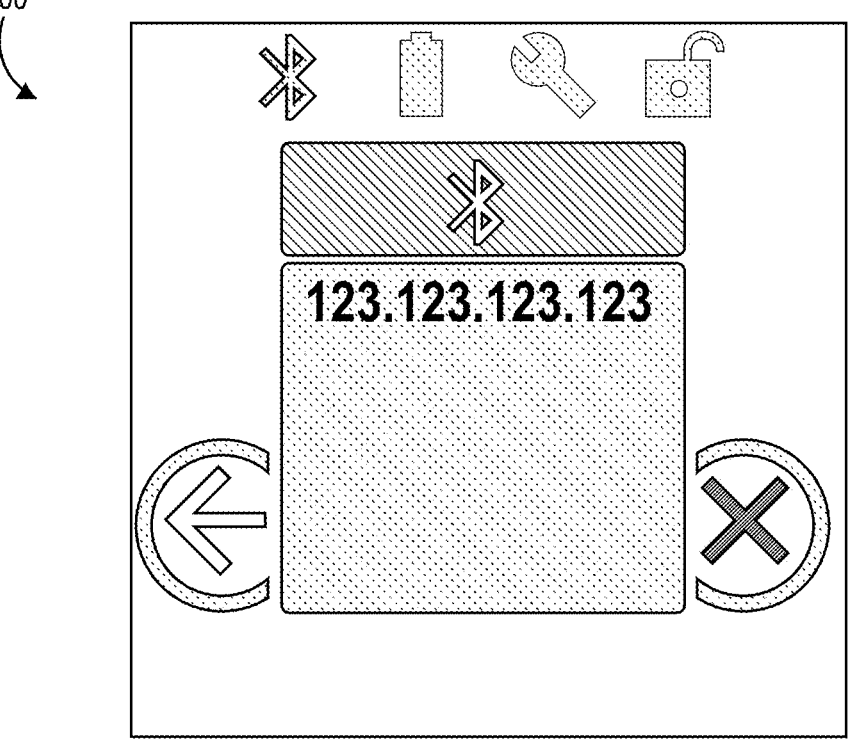
FIG. 23 is an output image of the display screen of the user interface of FIG. 22, shown in a personal area network paired configuration, in accordance with example embodiments of the present disclosure.
Figures 24, 25:
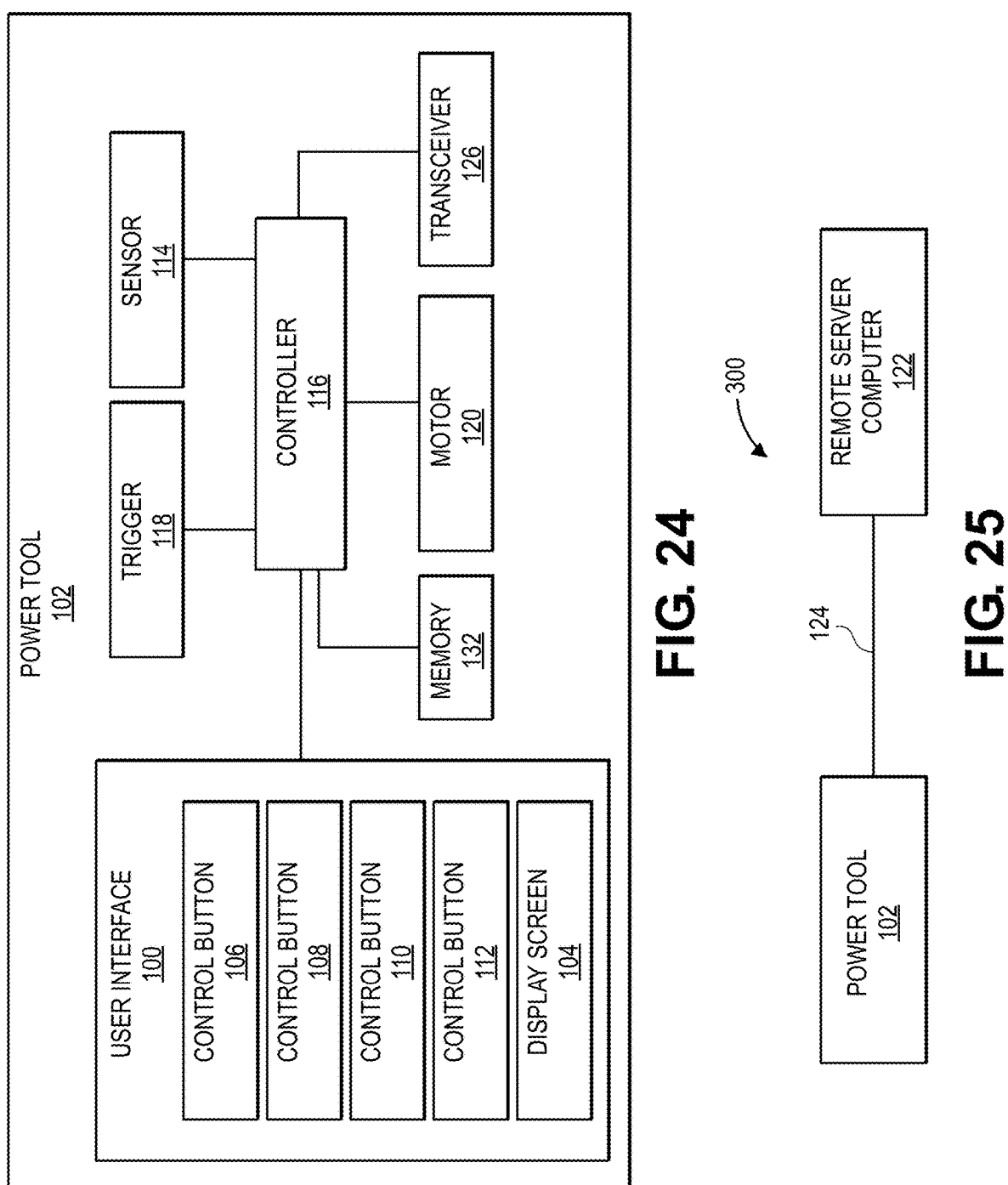
FIG. 24 is a block diagram view of electrical components of a hand-held power tool, such as the hand-held power tool of FIG. 1, in accordance with example embodiments of the present disclosure.
FIG. 25 is a block diagram view of a communications network between a hand-held power tool, such as the hand-held power tool of FIG. 1, and a remote server computer, in accordance with example embodiments of the present disclosure.

Referring to FIGS. 13 through 22, the user interface 100 is shown in various wireless communication settings configurations, where FIGS. 14 through 16 show aspects of wireless network selection configurations (e.g., to facilitate Wi-Fi connectivity for the tool 102), FIGS. 17 through 19 show aspects of wireless network access point selection configurations, and FIGS. 20 through 22 show aspects of personal area network selection configuration (e.g., to facilitate Bluetooth connectivity for the tool 102). Generally referring to FIGS. 24 and 25, a block diagram view of electrical components of the power tool 102 and a communication environment 300 are depicted. Controller 116 is electrically coupled to the user interface 100 to receive user inputs from the control buttons 106, 108, 110, and 112 and to display information on the display screen 104. Controller 116 is coupled to one or more sensors 114 to receive sensor data associated with the one or more sensors 114. In embodiments, controller 116 determines a state of a fastening operation (e.g., marginal fastening operation, failed fastening operation, completed fastening operation) based on the sensor data and displays the determined state of the fastening operation to display screen 104. In general, the power tool 102 includes a trigger 118 operatively coupled to the controller 116, and the controller 116 is operatively coupled to a motor 120 that drives an output shaft of the power tool 102. In embodiments, controller 116 is configured to receive signals from the trigger 118 that correspond to an engagement or disengagement of the trigger 118 by a user, and further configured to control power (e.g., limit, throttle, or logically supply current electrical power (i.e., current and voltage)) supplied to the motor 120 based on the engagement or disengagement of the trigger 118. In embodiments, controller 116 limits, throttles, or logically controls at least one of power, torque, or speed based on the Pset stored in memory on the power tool 102 or on a memory located on a remote server computer 122 that electrically communicates with and operatively controls controller 116.

The power tool 102 may be monitored and/or controlled by one or more computing systems (e.g., remote server computer 122) that may communicate with the controller 116. The one or more computing systems can be connected to the controller 116 of the power tool 102, either by direct connection, or through one or more network connections 124 (e.g., local area networking (LAN), controller area network (CAN), etc.), wireless area networking (WAN or WLAN), one or more hub connections (e.g., USB hubs), and so forth). For example, the one or more computing systems can be communicatively coupled (e.g., hard-wired or wirelessly) to the controller 116 of the power tool 102.

The controller 116 and/or remote server computer 122 may comprise a processor configured to execute computer readable program instructions (i.e., control logic) from a non-transitory carrier medium (e.g., storage medium such as a flash drive, solid-state disk drive, SD card, or the like). The program instructions, when executing by the processor, can cause the controller 116 and/or remote server computer 122 to control the power tool 102 (e.g., controlling power supplied to motor 120). In an implementation, the program instructions form at least a portion of software programs for execution by the processor.

The processor executes program instructions for the controller 116, remote server computer 122, and power tool 102 and may comprise any number of processors, micro-controllers, or other processing systems, and resident or external memory for storing data and other information accessed or generated by the computing system. The processor is not limited by the materials from which it is formed or the processing mechanisms employed therein.

The memory may comprise a non-transitory carrier medium provides storage of various data associated with the operation of the controller 116 and/or remote server computer 122, such as firmware, a software program, code segments, or program instructions, or other data to instruct the processor and other elements of the controller 116, remote server computer 112, and power tool 102 to perform the methods described herein. The carrier medium may be integral with the processor, stand-alone memory, or a combination of both. The carrier medium may include, for example, removable and non-removable memory elements such as RAM, ROM, Flash (e.g., SD Card, mini-SD card, micro-SD Card), USB memory devices, and so forth. In embodiments of the computing system, the carrier medium may include removable ICC (Integrated Circuit Card) memory such as provided by SIM (Subscriber Identity Module) cards, USIM (Universal Subscriber Identity Module) cards, UICC (Universal Integrated Circuit Cards), and so on.

In some embodiments, the power tool 102 may further include one or more input/output (I/O) devices (e.g., a trigger (such as trigger 118), a keypad, buttons (such as buttons 106, 108, 110, and 112), a touchscreen, a speaker, etc.) that communicate with the controller 116 to allow a user to operate and control settings of the power tool 102.

The controller 116 and the remote server computer 122 may also include a communication device to permit the controller 116 to send/receive data over the one or more networks. The communication device may, for example, comprise a transmitter and/or receiver, or a combination thereof (i.e., transceiver 126); data ports; software interfaces and drivers; networking interfaces; data processing components; and so forth.

The one or more networks 124 are representative of a variety of different communication pathways and network connections which may be employed, individually or in combinations, to facilitate communication between external computing devices (e.g., remote server computer 122) and the controller 116 of the power tool 102. Thus, the one or more networks 124 may be representative of communication pathways achieved using a single network or multiple networks. Further, the one or more networks 124 are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth. Examples of wireless networks include but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

While various embodiments of the power tool 102 have been described, it should be understood that the embodiments are not so limited, and modifications may be made without departing from the embodiments herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the power tool 102, and it is not necessarily expected that all of the described advantages will be achieved with every embodiment of the power tool 102. Other examples may occur to those skilled in the art based on the present disclosure. Such other examples are intended to be within the scope of the present disclosure.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

The invention claimed is:

1. A hand-held portable power tool, comprising:
a motor;
a controller operatively coupled to the motor, the controller including a transceiver configured to facilitate wireless bidirectional communication between the controller and a remote server computer; and
a user interface in electrical communication with the controller, the user interface including a display screen and a plurality of control buttons, the controller configured to receive inputs from the respective plurality of control buttons when at least one button among the plurality of control buttons is actuated, the controller configured to display an image on the display screen, wherein the image includes at least a plurality of icons that correspond to the plurality of control buttons, such that interacting with a respective control button adjacent to a respective icon displayed on the user interface causes the user interface to display information pursuant to the respective icon,
wherein received inputs from the respective plurality of control buttons instruct the controller to store on a memory of the hand-held portable power tool or a memory of the remote server computer one or more operational settings of the hand-held power tool, the one or more operational settings corresponding to at least one of limit, throttle, or logically supply electrical power corresponding to rotational direction, speed, acceleration, torque, torque limit, cycle timeout, or step type of the motor,
wherein the controller controls the motor based on the stored one or more operational settings.

2. The hand-held portable power tool of claim 1, further comprising:
one or more sensors configured to measure and generate sensor data based on at least one of torque, rotation speed, power output, or cycle count of the hand-held power tool,
wherein the controller is further configured to:
receive the sensor data from the one or more sensors,
determine a fastening operation state based on the sensor data, and
display on the display screen an icon corresponding to the determined fastening operation state.

3. The hand-held portable power tool of claim 2, wherein the icon is colored such that the color corresponds to the fastening operation state.

4. The hand-held portable power tool of claim 3, wherein the icon is green colored in response to the determined fastening operation state is a successful fastening operation.

5. The hand-held portable power tool of claim 3, wherein the icon is yellow colored in response to the determined fastening operation state is a marginal fastening operation.

6. The hand-held portable power tool of claim 3, wherein the icon is red colored in response to the determined fastening operation state is a failed fastening operation.

7. The hand-held portable power tool of claim 3, wherein the icon is green colored in response to the determined fastening operation state is a successful fastening operation.

8. The hand-held portable power tool of claim 3, wherein the icon is yellow colored in response to the determined fastening operation state is a marginal fastening operation.

9. The hand-held portable power tool of claim 3, wherein the icon is red colored in response to the determined fastening operation state is a failed fastening operation.

10. The hand-held portable power tool of claim 2, wherein the icon is colored such that the color corresponds to the fastening operation state.

11. The hand-held portable power tool of claim 1, wherein, responsive to a selected full power mode, the controller is configured to display an icon on the display screen that indicates the hand-held power tool is in full power mode.

12. The hand-held portable power tool of claim 11, wherein the displayed icon is blue.

13. The hand-held portable power tool of claim 11, wherein the displayed icon is blue.

14. The hand-held portable power tool of claim 1, wherein, responsive to a locked configuration, the controller is configured to display a lock icon.

15. The hand-held portable power tool of claim 14, wherein the controller is configured to disable operation of the one or more buttons while the hand-held portable power tool is in the locked configuration.

16. The hand-held portable power tool of claim 14, wherein the control is configured to disable the motor while the hand-held portable power tool is in the locked configuration.

17. The hand-held portable power tool of claim 1, wherein, responsive to a selected full power mode, the controller is configured to display an icon on the display screen that indicates the hand-held power tool is in full power mode.

18. The hand-held portable power tool of claim 1, wherein, responsive to a locked configuration, the controller is configured to display a lock icon, the controller configured to disable operation of the one or more buttons while the hand-held portable power tool is in the locked configuration.

19. A hand-held portable power tool, comprising:
a motor;
one or more sensors configured to measure and generate sensor data based on at least one of torque, rotation speed, power output, or cycle count of the hand-held power tool;
a controller operatively coupled to the motor, the controller configured to receive the sensor data from the one or more sensors and determine a fastening operation state based on the sensor data; and
a user interface in electrical communication with the controller, the user interface including a display screen and a plurality of control buttons, the controller configured to receive inputs from the respective plurality of control buttons when at least one button among the plurality of control buttons is actuated, the controller configured to display an image on the display screen, wherein the image includes at least a plurality of icons that correspond to the plurality of control buttons, such that interacting with a respective control button adjacent to a respective icon displayed on the user interface causes the user interface to display information pursuant to the respective icon, wherein received inputs from the respective plurality of control buttons instruct the controller to store on a memory of the hand-held portable power tool one or more operational settings of the hand-held power tool, the one or more operational settings corresponding to at least one of limit, throttle, or logically supply electrical power corresponding to rotational direction, speed, acceleration, torque, torque limit, cycle timeout, or step type of the motor, wherein the controller controls the motor based on the stored one or more operational settings, wherein the controller is configured to display on the display screen an icon corresponding to the determined fastening operation state.

20. A user interface for a hand-held portable power tool including a motor operatively controlled by a controller, the user interface comprising:

a display screen; and a plurality of control buttons, wherein the display screen is configured to display an image having a plurality of icons that correspond to the plurality of control buttons, such that interacting with a respective control button adjacent to a respective icon displayed on the user interface causes the user interface to display information pursuant to the respective icon.

* * * * *